United States Patent
Morimoto (10) Patent No.: US 10,237,069 B2
(45) Date of Patent: Mar. 19, 2019

(54) ON-CAR-DATA RECORDING APPARATUS AND IN-TRAIN-IMAGE DATA MANAGING SYSTEM

(71) Applicant: MITSUBISHI ELECTRIC CORPORATION, Chiyoda-ku, Tokyo (JP)

(72) Inventor: Kazunari Morimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 182 days.

(21) Appl. No.: 15/108,064

(22) PCT Filed: Jan. 6, 2014

(86) PCT No.: PCT/JP2014/050034
§ 371 (c)(1),
(2) Date: Jun. 24, 2016

(87) PCT Pub. No.: WO2015/102054
PCT Pub. Date: Jul. 9, 2015

(65) Prior Publication Data
US 2017/0005799 A1    Jan. 5, 2017

(51) Int. Cl.
*G06F 21/64* (2013.01)
*B61L 3/00* (2006.01)
(Continued)

(52) U.S. Cl.
CPC .............. *H04L 9/321* (2013.01); *B61L 3/002* (2013.01); *B61L 15/0072* (2013.01);
(Continued)

(58) Field of Classification Search
CPC ..... H04L 9/321; H04L 9/3236; H04L 9/3247; G06F 21/64; B61L 3/002; B61L 15/0072
See application file for complete search history.

(56) References Cited

U.S. PATENT DOCUMENTS 4,361,301 A * 11/1982 Rush ....................... B61L 1/18
104/298
6,772,331 B1    8/2004 Hind et al.
(Continued)

FOREIGN PATENT DOCUMENTS

JP    2000-293777 A    10/2000
JP    2003-500923 A    1/2003
(Continued)

OTHER PUBLICATIONS

International Search Report (PCT/ISA/210) dated Feb. 10, 2014, by the Japanese Patent Office as the International Searching Authority for International Application No. PCT/JP2014/050034.
(Continued)

*Primary Examiner* — Khang Do
(74) *Attorney, Agent, or Firm* — Buchanan Ingersoll & Rooney PC (57) ABSTRACT

An on-car-data recording apparatus mounted on a train to record image data, which is data of a video or an image photographed by an image pickup apparatus set in the train, including: a secret-key retaining unit that retains a secret key paired with a public key for electronic signature for which certification by a certification authority is completed, a train-specific-information managing unit that manages information specific to the own train capable of specifying a traveling position of the own train, an electronic-signature generating unit that integrates, the image data and the information managed by the train-specific-information managing unit, calculates a hash value of obtained integrated data, and generates an electronic signature on the basis of the calculated hash value and the secret key, and an image data managing unit that retains the generated electronic signature and the image data used in generating the electronic signature in association with each other.

7 Claims, 7 Drawing Sheets

(51) Int. Cl.
*H04L 9/32* (2006.01)
*G09C 1/00* (2006.01)
*B61L 15/00* (2006.01)
*H04L 9/08* (2006.01)

(52) U.S. Cl.
CPC .......... *B61L 15/0081* (2013.01); *G06F 21/64* (2013.01); *G09C 1/00* (2013.01); *H04L 9/0897* (2013.01); *H04L 9/3247* (2013.01)

(56) References Cited

U.S. PATENT DOCUMENTS

| | | | |
|---|---|---|---|
| 6,886,095 B1 | | 4/2005 | Hind et al. |
| 6,968,058 B1 * | | 11/2005 | Kondoh .................. H04N 7/188 |
| | | | 348/E7.056 |
| 6,980,660 B1 * | | 12/2005 | Hind .................. H04L 63/0823 |
| | | | 380/277 |
| 2003/0016834 A1 * | | 1/2003 | Blanco ............... G08B 13/1672 |
| | | | 381/91 |
| 2003/0081935 A1 * | | 5/2003 | Kirmuss .................. H04N 7/18 |
| | | | 386/327 |
| 2004/0064703 A1 | | 4/2004 | Makita |
| 2008/0295138 A1 * | | 11/2008 | Emoto .................. B61D 49/00 |
| | | | 725/81 |
| 2011/0235989 A1 * | | 9/2011 | Morimono .......... B61L 15/0036 |
| | | | 386/230 |

FOREIGN PATENT DOCUMENTS

| | | |
|---|---|---|
| JP | 2003-108708 A | 4/2003 |
| JP | 2004-110197 A | 4/2004 |
| JP | 2007-081596 A | 3/2007 |
| JP | 2007-221435 A | 8/2007 |
| JP | 2008-263344 A | 10/2008 |
| JP | 2009-099009 A | 5/2009 |

OTHER PUBLICATIONS

Written Opinion (PCT/ISA/237) dated Feb. 10, 2014, by the Japanese Patent Office as the International Searching Authority for International Application No. PCT/JP2014/050034.

Japanese Office Action dated Jan. 17, 2017 issued in corresponding Japanese Patent Appln. No. 2015-555860, with English translation (11 pages).

Japanese Office Action dated Oct. 4, 2016 issued in corresponding Japanese Patent Appln. No. 2015-555860, with English translation (7 pages).

* cited by examiner

ON-CAR-DATA RECORDING APPARATUS AND IN-TRAIN-IMAGE DATA MANAGING SYSTEM

FIELD

The present invention relates to an on-car-data recording apparatus mounted on a train of a railroad system and to an electronic signature system for trains.

BACKGROUND

In recent years, there has been examined a system in which a camera for monitoring is attached in a car of a railroad system and data obtained by photographing a congestion situation and the like in the car (hereinafter referred to as "image data") is transferred to display apparatuses set in a motorman's cab, a conductor's compartment, and the like to enable a motorman and a conductor to easily check a situation in the car.

When the camera for monitoring is attached in the car as explained above, crime prevention in the car can be expected. When a crime actually occurs in the car, it is likely that the data photographed by the camera can be used as a proof and an evidence of the crime. However, because the image data is in a digital format, contents of the image data can be easily altered. Reliability of the image data is a problem. As measures against such a problem, there is a technology for performing an electronic signature on photographed image data to thereby guarantee reliability of the data (a proof that the data is not altered) (e.g., Patent Literature 1).

CITATION LIST

Patent Literature

Patent Literature 1: Japanese Patent Application Laid-Open No. 2007-81596

SUMMARY

Technical Problem

In the case of data photographed in a train, to adopt the data as, for example, an evidence in a trial, it is likely that importance is placed not only on whether data is simply not altered but also where the data is photographed. Therefore, simply by performing the electronic signature on the image data, although it is guaranteed that the data is not altered, there is a problem in that it is likely that the data is not useful when importance is placed on a photographing time and a photographing place (where the train was traveling when the data was photographed).

The present invention has been devised in view of the above and it is an object of the present invention to obtain an on-car-data recording apparatus and an in-train-image data managing system capable of guaranteeing reliability of videos and images photographed in a train and storing the videos and the images in a state in which photographing places can be specified.

Solution to Problem

To solve the problems and achieve the object, the present invention provides an on-car-data recording apparatus mounted on a train to record image data, which is data of a video or an image photographed by an image pickup apparatus set in the train, the on-car-data recording apparatus including: a secret-key retaining unit that retains a secret key paired with a public key for electronic signature for which certification by a certification authority is completed; a train-specific-information managing unit that manages information specific to the own train capable of specifying a traveling position of the own train; an electronic-signature generating unit that integrates, every time the image data is generated by the image pickup apparatus, the generated image data and train specific information, which is the information managed by the train-specific-information managing unit, calculates a hash value of obtained integrated data, and generates an electronic signature on the basis of the calculated hash value and the secret key; and a image data managing unit that retains the electronic signature generated by the electronic-signature generating unit and the image data used in generating the electronic signature in association with each other.

Advantageous Effects of Invention

According to the present invention, it is possible to discriminate whether the image data is not altered and manage the image data in a state in which it is possible to specify when and where the image data is photographed.

DESCRIPTION OF EMBODIMENTS

An embodiment of an on-car-data recording apparatus and an in-train-image data managing system according to the present invention is explained in detail below with reference to the drawings. Note that the present invention is not limited by the embodiment.

Embodiment

Figure 1:
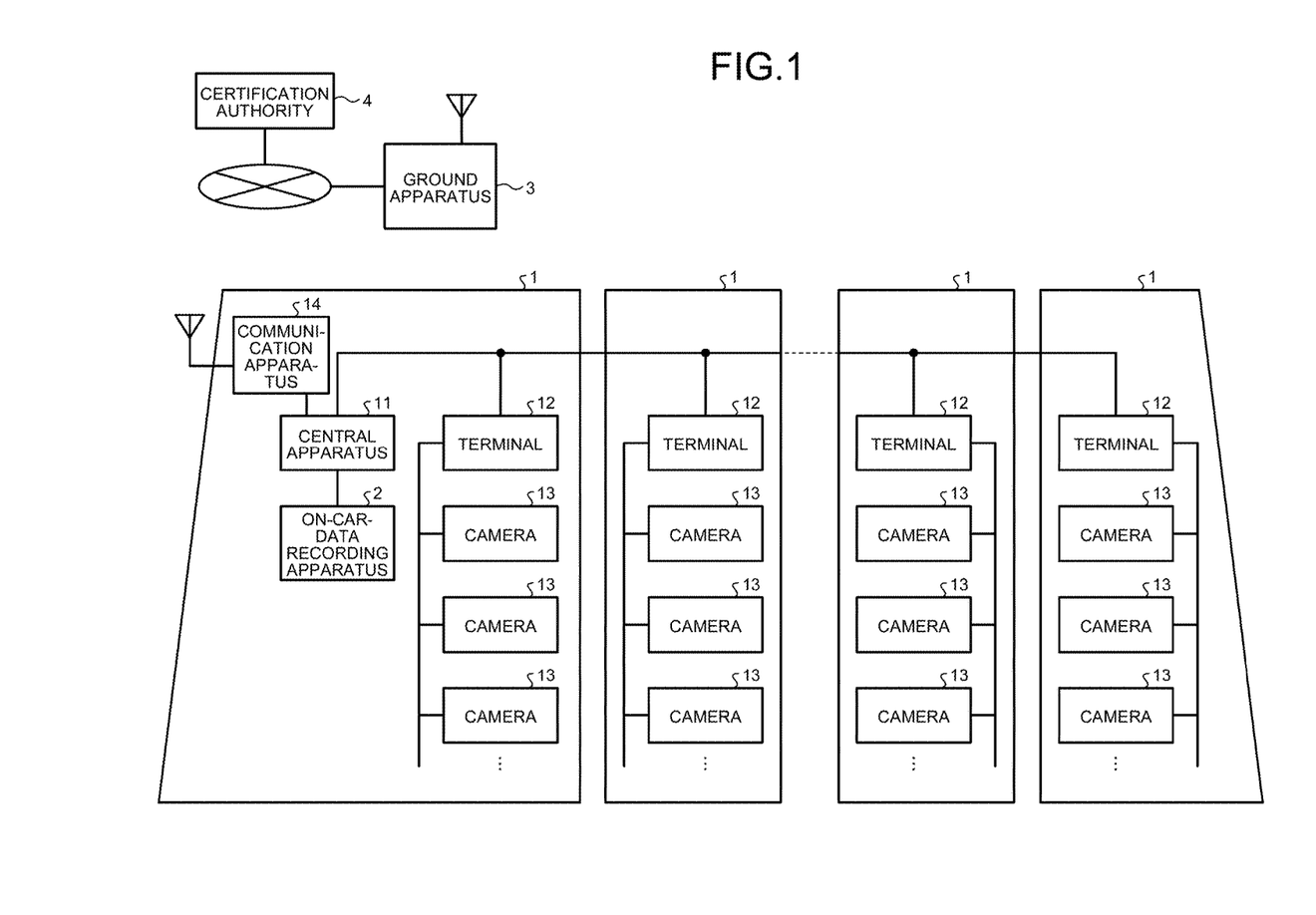
FIG. 1 is a diagram showing an application example of an in-train-image data managing system.

FIG. 1 is a diagram showing a configuration example of a railroad system applied with an in-train-image data managing system according to the present invention. The in-train-image data managing system includes an on-car-data recording apparatus 2 mounted on a car 1 of a train and a ground apparatus 3 set on the ground. The on-car-data recording apparatus 2 is mounted on, for example, a head car 1. The on-car-data recording apparatus 2 is connected to a central apparatus 11. The central apparatus 11 is connected to terminals 12 set in cars 1 via a trunk transmission path (inter-car transmission path) disposed across carts. One or more cameras 13 functioning as image pickup apparatuses are connected to the terminals 12 of the cars 1 via branch transmission paths (in-car transmission paths). Note that, although not described herein, various apparatuses (e.g., air conditioners, lighting apparatuses, brake apparatuses, and display apparatuses) other than the cameras are also connected to the terminals 12. The central apparatus 11 is connected to a communication apparatus 14 and configured to be capable of communicating with the ground apparatus 3 via the communication apparatus 14. Note that the communication apparatus 14 communicates with the ground apparatus 3 via a radio base station set in a station, beside a railroad, or the like.

The central apparatus 11 and the terminals 12 configure a train-information managing apparatus. The central apparatus 11 collects information from train-mounted apparatuses such as air conditioners, brake apparatuses, and motors set in the cars via the trunk transmission path, the terminals 12, and the branch transmission paths and manages the information and controls the train-mounted apparatuses. The central apparatus 11 controls the train-mounted apparatuses according to an instruction from, for example, a master controller in a motorman's cab not shown in the figure.

The cameras 13 are set in predetermined positions in the cars 1, for example, upper door lintel sections of doors and photograph states in the cars. Data of photographed images and videos are transmitted to the on-car-data recording apparatus 2 at specified timing and stored.

The on-car-data recording apparatus 2 receives data (image data) from the cameras 13 in the train, performs an electronic signature, and then stores the data. The communication apparatus 14 communicates with the ground apparatus 3 via a radio transmission path. Note that, in FIG. 1, a configuration example is shown in which one on-car-data recording apparatus 2 is mounted on one train. However, a plurality of on-car-data recording apparatuses 2 can be mounted. For example, the on-car-data recording apparatuses 2 can be mounted in the cars 1 at both ends of the train. The on-car-data recording apparatuses 2 can be mounted one by one in the cars 1.

The ground apparatus 3 generates a pair of keys (a public key and a secret key) used in the electronic signature by the on-car-data recording apparatus 2. The ground apparatus 3 can include a function of receiving, according to necessity, the image data stored in the on-car-data recording apparatus 2 and determining reliability of the data, that is, whether the data is not altered. Another apparatus (not shown in the figure) other than the ground apparatus 3 can include the function of determining the reliability of the data (whether the data is not altered).

Note that FIG. 1 shows an example in which the train mounted with the on-car-data recording apparatus 2 is one train. However, actually, a plurality of trains mounted with the on-car-data recording apparatuses 2 are present. The ground apparatus 3 individually generates a pair of a public key and a secret key for each of the plurality of trains (in the case of a configuration in which one on-car-data recording apparatus 2 is mounted on one train). When a plurality of on-car-data recording apparatuses 2 are mounted on one train, the ground apparatus 3 generates pairs of public keys and secret keys as many as the mounted on-car-data recording apparatuses 2. That is, the ground apparatus 3 individually generates a pair of a public key and a secret key for each of the on-car-data recording apparatuses 2 present in the system.

A certification authority 4 is connected to, for example, a wired network and capable of communicating with the ground apparatus 3. When receiving a request from the ground apparatus 3, the certification authority 4 issues an electronic certificate of the public key generated by the ground apparatus 3.

In the in-train-image data managing system shown in FIG. 1, when receiving image data from the camera 13, the on-car-data recording apparatus 2 adds information concerning a place where a train mounted with the on-car-data recording apparatus 2 is traveling at that point in time to the image data as train specific information and then performs an electronic signature using the secret key generated by the ground apparatus 3. For example, when predetermined operation is performed by a staff member of a railroad system, the ground apparatus 3 acquires image data corresponding to operation content, train specific information added before an electronic signature is performed on the image data, and the electronic signature from the on-car-data recording apparatus 2 and determines reliability of the acquired image data on the basis of an electronic certificate for a public key paired with a secret key used by the on-car-data recording apparatus 2 at a data acquisition source in performing the electronic signature and the train specific information and the electronic signature acquired from the on-car-data recording apparatus 2.

Figure 2:
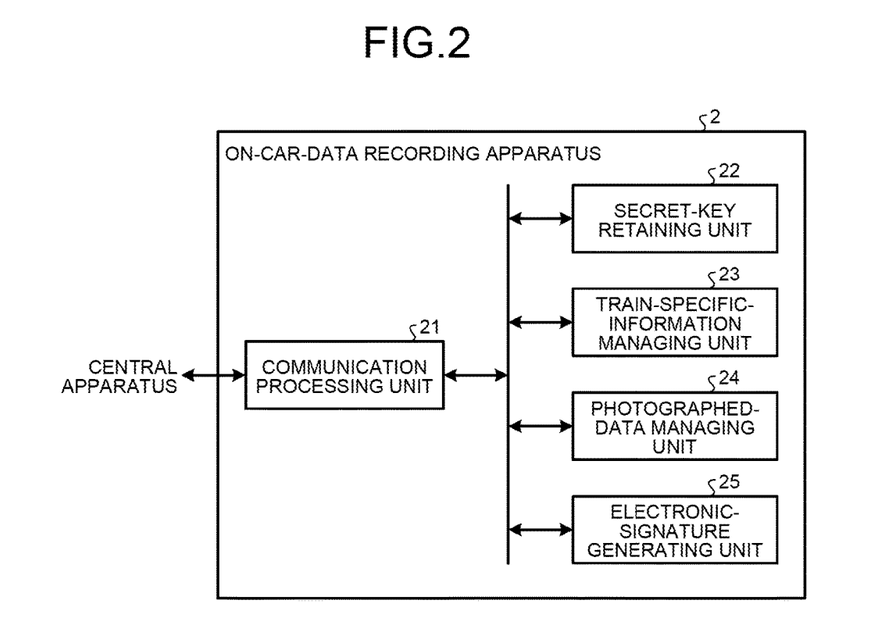
FIG. 2 is a diagram showing a configuration example of an on-car-data recording apparatus.

FIG. 2 is a diagram showing a configuration example of the on-car-data recording apparatus 2. The on-car-data recording apparatus 2 includes a communication processing unit 21, a secret-key retaining unit 22, a train-specific-information managing unit 23, a image data managing unit 24, and an electronic-signature generating unit 25.

In the on-car-data recording apparatus 2, the communication processing unit 21 is an interface with the central apparatus 11. The communication processing unit 21 acquires various data managed by the central apparatus 11 and receives, via the terminals 12 and the central apparatus 11, as image data, various videos photographed by the cameras 13 in the train. The communication processing unit 21 transmits and receives data to and from the ground apparatus 3 via the central apparatus 11 and the communication apparatus 14.

The secret-key retaining unit 22 acquires a secret key used in an electronic signature from the ground apparatus 3 and retains the secret key.

The train-specific-information managing unit 23 retains information specific to the own train (the train mounted with the on-car-data recording apparatus 2) as train specific information. The train specific information is information concerning a traveling place of the own train. The train specific information is, for example, a train number, a formation number of the train, identification information (a motorman ID) of a motorman, information concerning a traveling route, and information concerning a traveling section. The train-specific-information managing unit 23 retains one or two or more kinds of information as train specific information out of these kinds of information. These kinds of information are generally managed by the train-information managing apparatus. The train-specific-information managing unit 23 acquires in advance, for example, necessary information from the central apparatus 11 configuring the train-information managing apparatus. The train number is information indicating an operation schedule of the own train. If the train number is known, it is possible to learn when and where the train given with the train number travels (traveled). The formation number is identification information of the train formed by one or more cars. The formation number allocated to the train is fixed. When the train is operated, the train number is given to the train. In the ground apparatus 3 shown in FIG. 1 and an operation managing system (not shown in the figure) on the ground side, operation management of the train and crew members (e.g., which train number is allocated to which formation number and which crew member is allocated to a train having which train number) is performed. If the formation number and the motorman ID are known, it is possible to learn when and where a train corresponding to the formation number and the motorman ID travels (or traveled).

Note that the train-specific-information managing unit 23 can acquire the information such as the train number, the formation number of the train, and the motorman ID at timing when the information is necessary, specifically, timing when the electronic-signature generating unit 25 explained below generates an electronic signature rather than acquiring the information in advance. Because crew members of the train sometimes change in a halfway stop station or the like, when information concerning the crew members (the motorman ID, etc.) is used as the train specific information, the train specific information retained by the train-specific-information managing unit 23 can be changed by a communication apparatus and a recording medium such as an IC card.

The image data managing unit 24 receives image data transmitted from the camera 13, adds an electronic signature generated by the electronic-signature generating unit 25 explained below to the image data, and manages the image data.

The electronic-signature generating unit 25 generates, on the basis of the train specific information managed by the train-specific-information managing unit 23, an electronic signature added to the image data transmitted from the camera 13.

Figure 3:
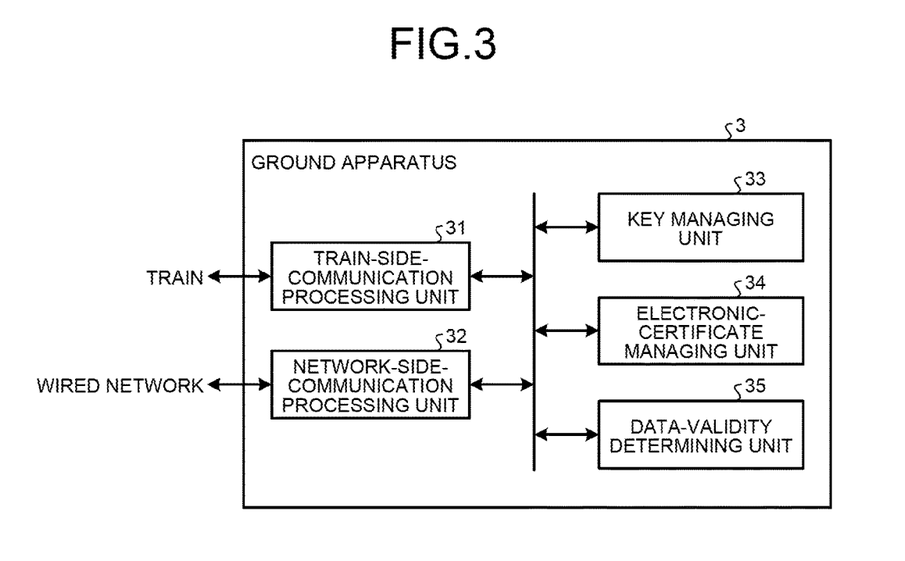
FIG. 3 is a diagram showing a configuration example of a ground apparatus.

FIG. 3 is a diagram showing a configuration example of the ground apparatus 3. The ground apparatus 3 includes a train-side-communication processing unit 31, a network-side-communication processing unit 32, a key managing unit 33, an electronic-certificate managing unit 34, and a data-validity determining unit 35.

In the ground apparatus 3, the train-side-communication processing unit 31 communicates with, via, for example, a not-shown antenna, the communication apparatus 14 (see FIG. 1) mounted on the train. The network-side-communication processing unit 32 is connected to, for example, a wired network and communicates with the certification authority 4 and the like on the outside.

The key managing unit 33 generates a pair of a secret key and a public key used by the on-car-data recording apparatus 2 mounted on the train in performing an electronic signature on image data in the camera 13. Note that, because the railroad system is configured by a plurality of trains, the key managing unit 33 individually generates the pair of the secret key and the public key for each of the plurality of trains.

The electronic-certificate managing unit 34 acquires an electronic certificate concerning each of public keys generated by the key managing unit 33 from the certification authority 4 and manages the electronic certificate.

The data-validity determining unit 35 determines whether the image data in the camera 13 retained by the on-car-data recording apparatus 2 is not altered. Note that an apparatus (another apparatus on the ground side not shown in FIG. 1) different from the ground apparatus 3 can include the data-validity determining unit 35. That is, an apparatus other than the ground apparatus 3 can determine validity of the image data retained by the on-car-data recording apparatus 2 (whether the image data is not altered).

The overall operation of the in-train-image data managing system is explained in detail. Note that, in the following explanation, the overall operation is divided into three operations, that is, an electronic-certificate managing operation, an electronic signature operation, and an electronic-signature verifying operation.

(Electronic-Certificate Managing Operation)

Figure 4:
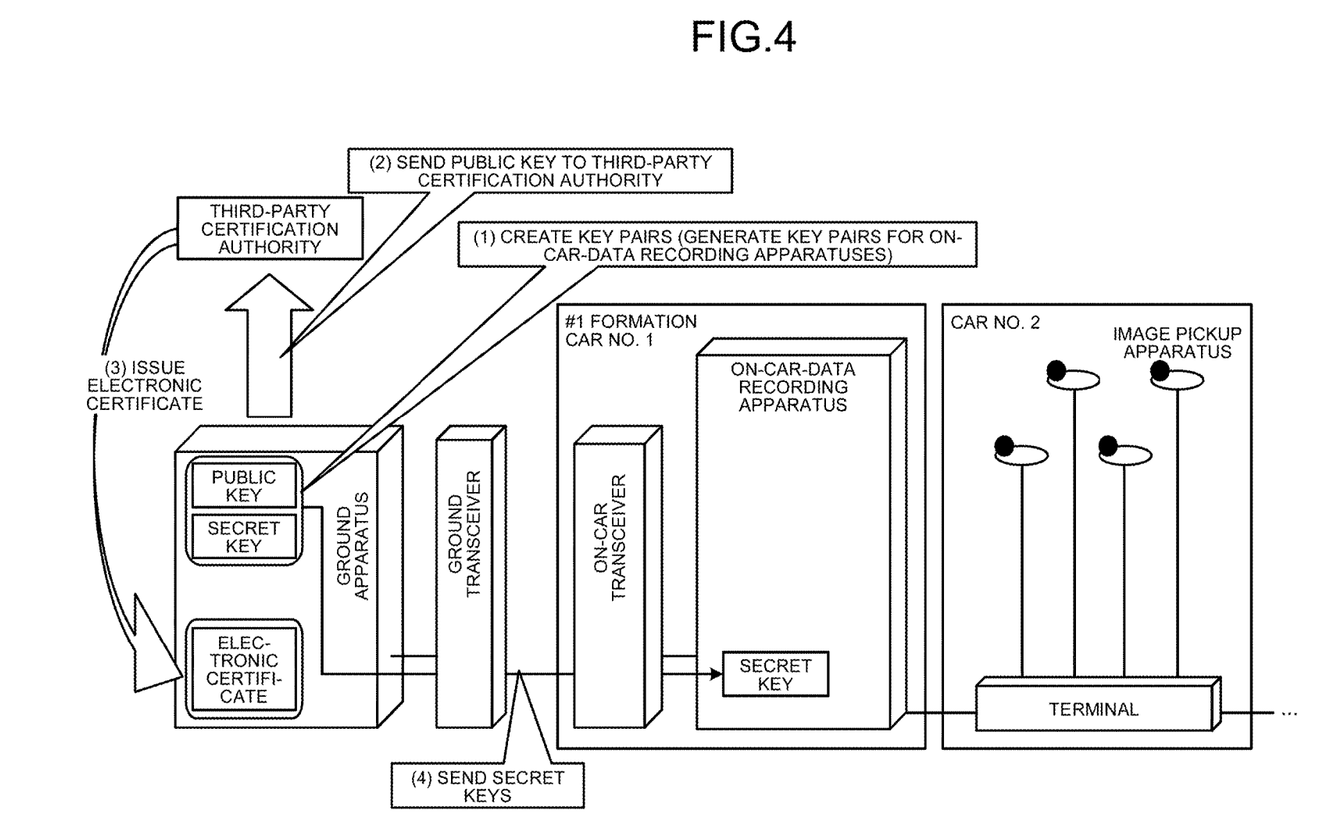
FIG. 4 is a diagram showing an overview of an electronic-certificate managing operation.

FIG. 4 is a diagram showing an overview of the electronic-certificate managing operation. The electronic-certificate managing operation includes procedures (1) to (4) shown in FIG. 4. The procedures are explained below with reference to FIG. 2, FIG. 3, and FIG. 4.

(1) Creation of Key Pairs

In the ground apparatus 3, the key managing unit 33 creates pairs of public keys and secret keys for electronic signature respectively allocated to the plurality of on-car-data recording apparatuses 2 in the system. The pairs of the public keys and the secret keys are created by a publicly-known creation method for a key for an electronic signature.

(2) Send the Public Keys to a Third-Party Certification Authority

When the creation of the public keys and the secret keys is completed, subsequently, the key managing unit 33 sends the created public keys to a third-party certification authority (equivalent to the certification authority 4 shown in FIG. 1) through the network-side-communication processing unit 32.

(3) Issuance (Acquisition) of an Electronic Certificate

When the sending of the public keys to the third-party certification authority by the key managing unit 33 is completed, an electronic certificate for the sent public keys is issued by the third-party certification authority. The electronic-certificate managing unit 34 of the ground apparatus 3 receives and manages the issued electronic certificate.

(4) Sending of the Secret Keys

The key managing unit 33 sends the secret keys created in (1) above to the on-car-data recording apparatus 2. In the on-car-data recording apparatus 2 that receives the sending of the secret keys, the secret-key retaining unit 22 receives and retains the secret keys. Note that, because the secret keys need to be treated not to be known to the outside, the sending of the secret keys from the ground apparatus 3 to the on-car-data recording apparatus 2 is desirably performed by a method of performing the sending using, for example, a leased line having high security or manually performing the sending using a small memory device or the like. The sending operation of the secret keys can be immediately started after the creation of the key pairs in (1) above is completed without waiting for (2) and (3) above to be completed.

In the electronic-certificate managing operation explained above, the procedures other than (4) are the same as issuance of key pairs and an electronic certificate in a conventional general electronic signature system.

(Electronic Signature Operation)

Figure 5:
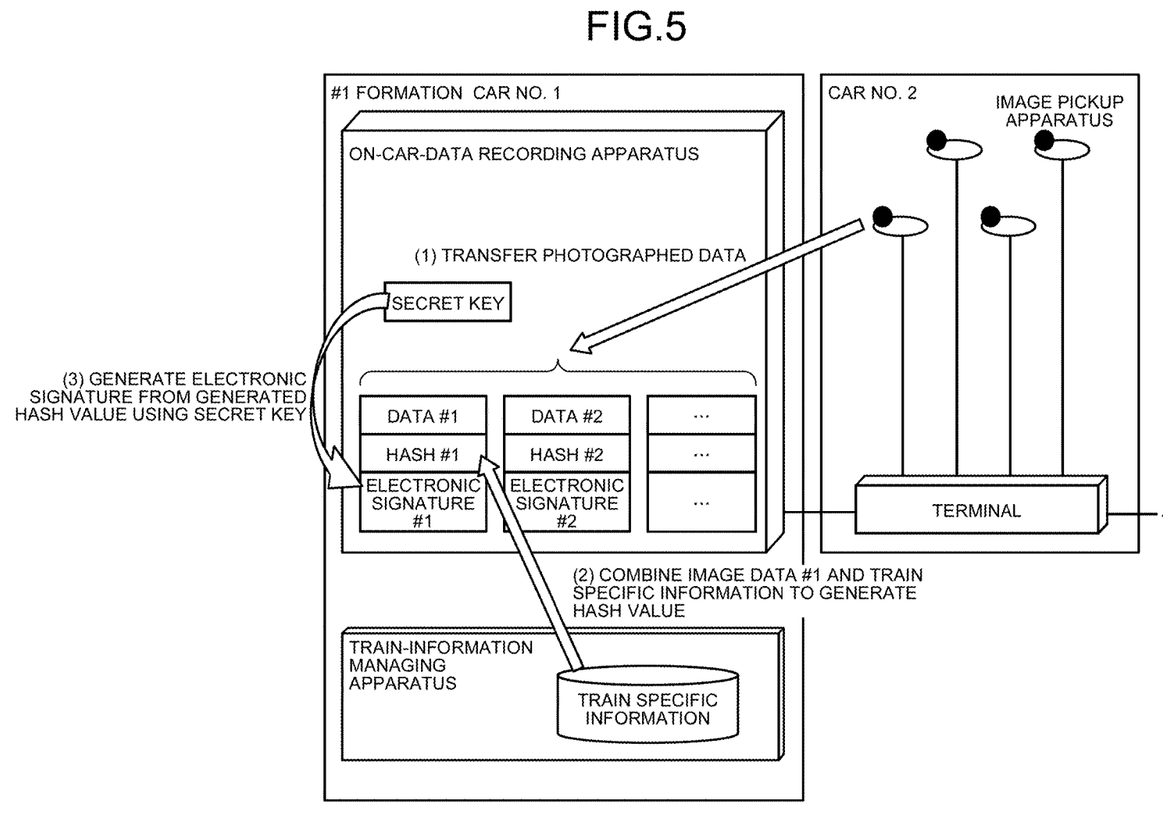
FIG. 5 is a diagram showing an overview of an electronic signature operation.

FIG. 5 is a diagram showing an overview of the electronic signature operation. The electronic signature operation includes procedures (1) to (3) shown in FIG. 5. When image data is transmitted from the image pickup apparatus, which is the camera 13 shown in FIG. 1, the on-car-data recording apparatus 2 executes the electronic signature operation and then stores the image data. The procedures are explained below with reference to FIG. 2 and FIG. 5.

(1) Transmission of Image Data (Acquisition of Image Data)

The image pickup apparatuses (the cameras 13) set in the cars of the train photograph states in the cars. When predetermined timing determined in advance comes, the image pickup apparatuses transmit image data to the on-car-data recording apparatus 2. For example, when a size of the image data reaches a specified size (equivalent to n frames of image data) or when a photographing time reaches a specified time (every time the image pickup apparatuses perform photographing for x seconds), the image pickup apparatuses transmit the image data to the on-car-data recording apparatus 2. Note that it is assumed that information concerning photographing date and time (e.g., one or both of photographing start time and photographing end time) is included in the image data.

(2) Generation of a Hash Value Corresponding to the Acquired Image Data

When the image data is transmitted from the image pickup apparatuses, in the on-car-data recording apparatus 2, first, the electronic-signature generating unit 25 receives the image data, adds train specific information to the received image data and calculates a hash value of the image data added with the train specific information.

(3) Generation of an Electronic Signature

When the calculation of the hash value ends, subsequently, the electronic-signature generating unit 25 generates an electronic signature on the image data added with the train specific information using the calculated hash value and the secret keys retained in the secret-key retaining unit 22. The generated electronic signature is retained by the image data managing unit 24 together with the image data. Note that the hash value can be discarded after the generation of the electronic signature ends.

Figure 6:
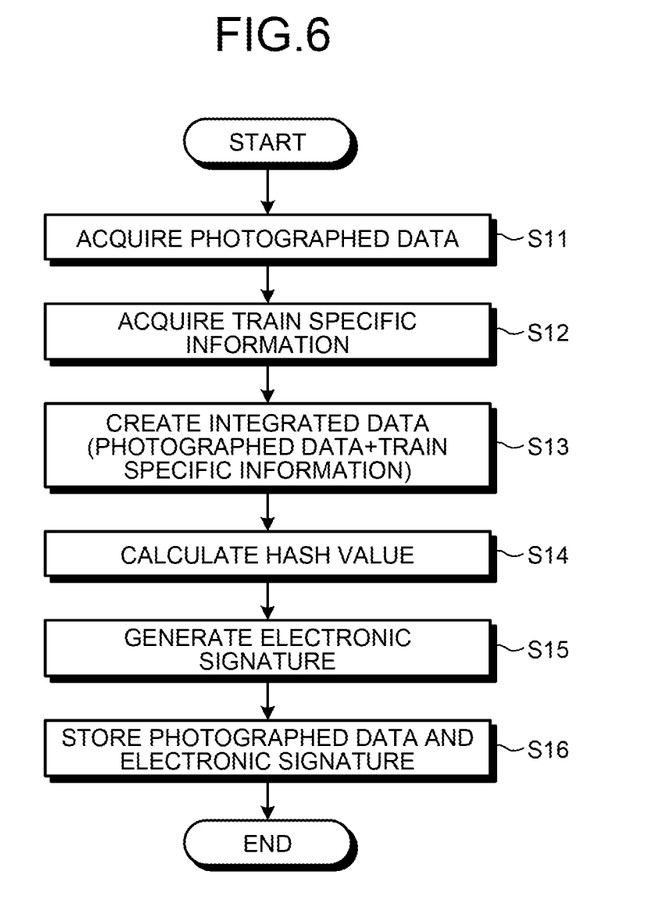
FIG. 6 is a flowchart for explaining an operation example of the on-car-data recording apparatus.

FIG. 6 is a flowchart for explaining an operation example of the on-car-data recording apparatus 2. The on-car-data recording apparatus 2 performs an electronic signature on image data according to the flowchart shown in FIG. 6.

That is, first, the electronic-signature generating unit 25 acquires, through the communication processing unit 21, image data transmitted from the image pickup apparatuses (step S11). Subsequently, the electronic-signature generating unit 25 acquires the train specific information managed by the train-specific-information managing unit 23 (step S12). The electronic-signature generating unit 25 adds the train specific information acquired at step S12 to the image data acquired at step S11 and creates integrated data (step S13). The electronic-signature generating unit 25 further calculates a hash value of the integrated data (step S14) and generates an electronic signature of the integrated data using the calculated hash value and the secret keys retained by the secret-key retaining unit 22 (step S15). The image data managing unit 24 stores the image data acquired at step S11 and the electronic signature calculated at step S15 in association with each other (step S16).

(Electronic-Signature Verifying Operation)

Figure 7:
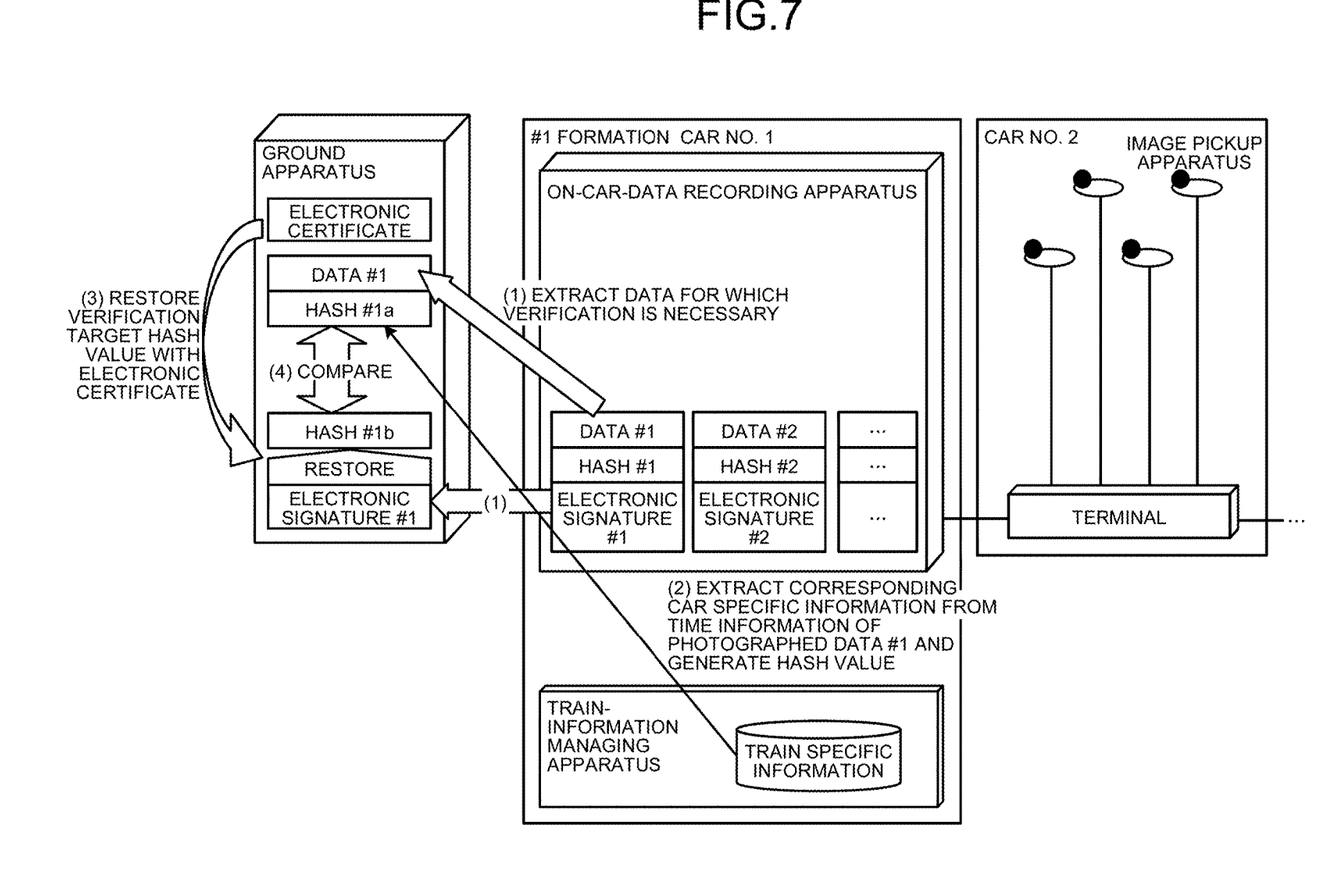
FIG. 7 is a diagram showing an overview of an electronic-signature verifying operation.

FIG. 7 is a diagram showing an overview of the electronic-signature verifying operation. The electronic-signature verifying operation includes procedures (1) to (4) shown in FIG. 7. For example, when receiving, from the outside, operation for instructing a verification start of the image data recorded in the on-car-data recording apparatus 2, the ground apparatus 3 executes the electronic-signature verifying operation. The procedures are explained below with reference to FIG. 2, FIG. 3, and FIG. 7.

(1) Acquisition of Verification Target Data

When the verification start of the image data is instructed, in the ground apparatus 3, first, the data-validity determining unit 35 acquires verification data indicated by instruction content from the on-car-data recording apparatus 2. It is assumed that the instruction content includes information concerning verification target data, that is, information indicating which image data retained by the on-car-data recording apparatus 2 mounted on which train the verification data is (when the verification data is photographed) (information of the on-car-data recording apparatus). It is assumed that the instruction content includes, for example, information indicating image data at AA month, BB day, hh hour, mm minute in a train having a train number XX. The data-validity determining unit 35 acquires, according to necessity, from a train-operation managing system or the like, information concerning a train formation operated as the train having the train number XX at a point in time of AA month, BB day, hh hour, mm minute and then acquires photographing data at the date and time from the on-car-data recording apparatus 2 mounted on a train corresponding to the information of the train formation. The data-validity determining unit 35 acquires an electronic signature associated with the image data as well.

(2) Generation of a First Hash Value

Subsequently, the data-validity determining unit 35 acquires train specific information same as the train specific information used during the electronic signature generation for the acquired image data from the train-information managing apparatus (the central apparatus 11) and further generates a hash value using the acquired image data and the acquired train specific information. Specifically, as in the electronic signature operation in the on-car-data recording apparatus 2, the data-validity determining unit 35 adds the train specific information to the image data and calculates, as a first hash value, a hash value (a hash #1a shown in the figure) of integrated data obtained as a result of the addition of the train specific information (image data added with the train specific information). Note that the train specific information can be acquired from the train-specific-information managing unit 23 of the on-car-data recording apparatus 2 rather than from the train-information managing apparatus.

(3) Generation of a Second Hash Value (Restoration of a Hash Value Based on an Electronic Signature)

The data-validity determining unit 35 restores, as a second hash value, a hash value (a hash #1b shown in the figure) from the electronic signature acquired from the on-car-data recording apparatus 2 and the electronic certificate managed by the electronic-certificate managing unit 34.

(4) Validity Determination of Image Data

Subsequently, the data-validity determining unit 35 compares the first hash value and the second hash value and, when both the hash values coincide with each other, determines that the image data is valid (i.e., not altered).

Figure 8:
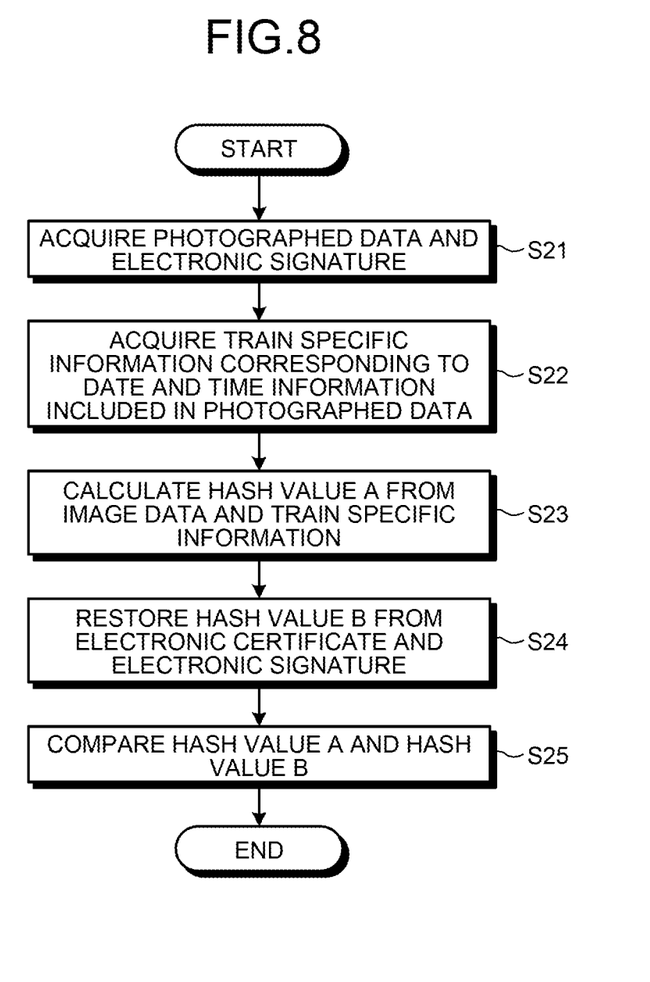
FIG. 8 is a flowchart for explaining an example of the electronic-signature verifying operation in the ground apparatus.

FIG. 8 is a flowchart for explaining an example of an image data-validity determining operation (an electronic-signature verifying operation) in the data-validity determining unit 35 of the ground apparatus 3. The data-validity determining unit 35 determines, according to the flowchart shown in FIG. 8, whether image data is valid image data not altered.

That is, first, the data-validity determining unit 35 acquires determination target image data and an electronic signature corresponding to the image data from the on-car-data recording apparatus 2 (step S21). Subsequently, the data-validity determining unit 35 acquires, from the on-car-data recording apparatus 2, train specific information corresponding to date and time information included in the acquired image data (step S22). The data-validity determining unit 35 calculates a hash value A (the first hash value) using the acquired image data and the acquired train specific information (step S23). Specifically, the data-validity determining unit 35 adds the train specific information to the image data to create integrated data and calculates a hash value of the integrated data. Subsequently, the data-validity determining unit 35 restores a hash value B (the second hash value) on the basis of, among electronic certificates retained by the electronic-certificate managing unit 34, an electronic certificate corresponding to the image data, that is, an electronic certificate corresponding to a public key paired with a secret key used by the on-car-data recording apparatus 2 used by the on-car-data recording apparatus 2 at an acquisition source of the image data, and the electronic signature acquired at step S21 (step S24). Finally, the data-validity determining unit 35 compares the hash value A and the hash value B (step S25). If the hash value A=the hash value B as a result of the comparison, the data-validity determining unit 35 determines that the image data set as the determination target (the image data acquired at step S21) is valid data.

In this way, the on-car-data recording apparatus in this embodiment acquires data (image data) photographed by each of the cameras set in the cars of the train, adds train specific information, which is information concerning a place where the own train is traveling at a point in time when the data is acquired, to the image data, then generates an electronic signature of the image data added with the train specific information, and retains the image data and the electronic signature. Consequently, it is possible to discriminate whether the retained image data is not altered and manage the image data and data concerning a photographing place of the image data in association with each other. That is, it is possible to store the image data in a state in which it is possible to specify when and where the data is photographed. For example, to falsify a photographing place, the train specific information is necessary in addition to the image data and the secret key. Therefore, it is possible to improve robustness of the stored data. When a plurality of kinds of information are used as the train specific information, it is possible to further improve the robustness.

INDUSTRIAL APPLICABILITY

As explained above, the on-car-data recording apparatus according to the present invention is useful as a recording apparatus for data photographed by an image pickup apparatus and, in particular, suitable for an apparatus for recording image data by an image pickup apparatus set in a train.

REFERENCE SIGNS LIST 1 car
2 on-car-data recording apparatus
3 ground apparatus
4 certification authority
11 central apparatus
12 terminal
13 camera
14 communication apparatus
21 communication processing unit
22 secret-key retaining unit
23 train-specific-information managing unit
24 image data managing unit
25 electronic-signature generating unit
31 train-side-communication processing unit
32 network-side-communication processing unit
33 key managing unit
34 electronic-certificate managing unit
35 data-validity determining unit

The invention claimed is:

1. An on-car-data recording apparatus mounted on a train to record image data, which is data of a video or an image photographed by an image pickup apparatus set in the train, the on-car-data recording apparatus comprising:
   a storage device that retains a secret key paired with a public key for electronic signature for which certification by a certification authority is completed;
   wherein the on-car-data recording apparatus is configured to:
      manage information specific to the own train, wherein the information specific to the own train is based on a relationship between a formation number of the train and an identification of at least one crew member associated with the train, wherein the relationship provides traveling position of the own train;
      integrate, every time the image data is generated by the image pickup apparatus, the generated image data and information specific to the own train, which is the information managed by the on-car-data recording apparatus, calculate a hash value of obtained integrated data, and generate an electronic signature on the basis of the calculated hash value and the secret key; and
      retain the electronic signature generated by the on-car-data recording apparatus and the image data used in generating the electronic signature in association with each other,
   wherein the on-car-data recording apparatus, at timing when the electronic signature is generated, is configured to acquire the information specific to the own train and determine the relationship between the formation number of the train and the identification of the at least one crew member associated with the train.

2. The on-car-data recording apparatus according claim 1, wherein the information specific to the own train further includes any one of a train number, identification information of a motorman, information concerning a traveling route, and information concerning a traveling section.

3. The on-car-data recording apparatus according claim 1, wherein the information specific to the own train further includes two or more of a train number, identification information of a motorman, information concerning a traveling route, and information concerning a traveling section.

4. An in-train-image data managing system comprising:
   an on-car-data recording apparatus mounted on a train to record image data, which is data of a video or an image photographed by an image pickup apparatus set in the train; and
   a ground apparatus set on a ground to determine presence or absence of alteration for the image data recorded by the on-car-data recording apparatus,
   wherein the ground apparatus is configured to:
      generate a public key and a secret key used in an electronic signature on the image data, request a certification authority to certify the generated public key, and pass the secret key to the on-car-data recording apparatus;
      manage an electronic certificate issued to the public key by the certification authority; and
      determine, on the basis of the electronic certificate, presence or absence of alteration for the image data recorded by the on-car-data recording apparatus, and the on-car-data recording apparatus is configured to:
- acquire the secret key from the ground apparatus and retain the secret key;
- manage information specific to the own train, wherein the information specific to the own train is based on a relationship between a formation number of the train and an identification of at least one crew member associated with the train, wherein the relationship provides traveling position of the own train;
- integrate, every time the image data is generated by the image pickup apparatus, the generated image data and information specific to the own train, which is the information managed by the on-car-data recording apparatus, calculate a hash value of obtained integrated data, and generate an electronic signature on the basis of the calculated hash value and the secret key; and
- retain the electronic signature generated by the on-car-data recording apparatus and the image data used in generating the electronic signature in association with each other, wherein the on-car-data recording apparatus, at timing when the electronic signature is generated, is configured to acquire the information specific to the own train and determine the relationship between the formation number of the train and the identification of the at least one crew member associated with the train.

5. The in-train-image data managing system according to claim 4, wherein the ground apparatus acquires any one image data retained by the on-car-data recording apparatus and an electronic signature associated with the image data and the information specific to the own train managed by the on-car-data recording apparatus, compares a hash value of integrated data obtained by adding the information specific to the own train to the acquired image data and a hash value restored on the basis of the acquired electronic signature and the electronic certificate and determines presence or absence of alteration for the acquired image data.

6. The in-train-image data managing system according to claim 4, wherein the information specific to the own car further includes any one of a train number, identification information of a motorman, information concerning a traveling route, and information concerning a traveling section.

7. The in-train-image data managing system according to claim 4, wherein the information specific to the own car further includes two or more of a train number, identification information of a motorman, information concerning a traveling route, and information concerning a traveling section.

* * * * *